United States Patent Office

3,289,577
Patented Dec. 6, 1966

3,289,577
WETTING AND CLEANSING AGENT FOR USE IN OFFSET PRINTING
Fritz Uhlig, Wiesbaden-Biebrich, Germany, assignor, by mesne assignments, to Azoplate Corporation, Murray Hill, N.J., a corporation of New Jersey
No Drawing. Filed Jan. 8, 1963, Ser. No. 250,002
Claims priority, application Germany, Jan. 11, 1962, K 45,625
4 Claims. (Cl. 101—149.2)

In offset printing, mutual repulsion of greasy ink and water is very important. As a rule, both greasy ink and water are supplied to the offset printing plate during the printing operation. The water has the function of protecting the non-printing parts of the printing plate from any tendency to take up ink. Frequently, however, the water is ousted by the printing ink and the plate becomes water-repellent in those parts which should not accept the greasy ink.

To meet this difficulty it has been proposed to use a wetting agent (sometimes called a fountain solution) which does not consist exclusively of water, but contains suitable additives; these wetting agents are also sometimes termed anti-scumming agents. Such fountain solutions do not, however, in all cases have a satisfactory effect. For example, metal salts in the fountain solution, if left in contact with the printing plate, produce undesirable crystallization on the plate. If an aqueous solution of a polyvalent alcohol is used for the purpose, a relatively concentrated solution is necessary and this is considerably affected by room temperature and atmospheric humidity and may produce sticky prints. When colloids such as soluble starches, gum arabic and other vegetable gums are used as the additives to the fountain solution, there is the disadvantage that these are excellent culture media for molds and bacteria.

In the case of the printing plates prepared from presensitized foils, the wetting agents hitherto used tend to attack the image parts or are sometimes incapable of preventing scumming in the image-free parts during interruptions in printing. Wetting agents containing highly dispersed silicon dioxide lose homogeneity during prolonged storage due to settling of the silicon dioxide particles.

It has been found, according to the present invention, that when polymeric sulfonic acids are present in a fountain solution used in offset printing, the disadvantages described above are eliminated. A very important technical advantage is found in the fact that the use of such a fountain solution renders it unnecessary to gum the printing plate during an interruption in printing, as the polymeric sulfonic acids, by forming a covering layer, protect the metal surface of the support from the action of atmospheric oxygen. Very small quantities of such a fountain solution can be successfully used and the consumption of printing ink can, therefore, be correspondingly reduced while nevertheless obtaining fully inked prints.

Polymeric sulfonic acids impart far superior hydrophilic properties to metal surfaces, particularly aluminum surfaces, which are used as supports in offset printing, than those imparted by orthophosphoric acid, which is frequently used. The action of imparting water-acceptant properties to the metal surface also removes oil and grease therefrom. Cleansing agents hitherto used consist of dispersions and contain a number of heterogeneous substances such as is the case, for example, in the dispersion described in U.S. Patent 2,780,168, which serves as cleansing agent for greasy printing plates and contains, in the aqueous phase, monovalent and multivalent alcohols and a colloidal dispersion of silicic acid and, in its non-aqueous phase, preferably petroleum ether.

The polymeric sulfonic acids suitable for use in the invention are those which contain sulfonic acid groups bound to aliphatic and/or aromatic carbon atoms. Preferably, polyvinyl sulfonic acid or polystyrene sulfonic acid is used. Interpolymers of styrene and vinyl compounds and maleic acid which contain sulfonic acid groups are also suitable.

The preparation of these polymeric sulfonic acids is described in the journal "Makromolekulare Chemie," vol. XXVIII (1958), No. 3, p. 219. Thus, polyvinyl sulfonic acid has been prepared by polymerizing sodium vinyl sulfonate, followed by conversion of the polymeric sodium salt in an ion exchange column, and polystyrene sulfonic acid has been prepared by sulfonizing polystyrene with $SO_3$ in dioxane. The fountain solution provided by the invention is obtained by dissolving a polymeric sulfonic acid or a mixture of several polymeric sulfonic acids in water; solution takes place readily. Fountain solutions with very low concentrations of polymeric sulfonic acid, e.g. 0.0001 percent by weight, give very good results in offset printing. In practice, however, it is generally advisable for the concentration of polymeric sulfonic acid in water to be 0.001 to 0.1 percent by weight.

Higher concentrations are advantageously used for removing greasy or oily patches from the metal surfaces, e.g., 0.1 to 10 percent of polymeric sulfonic acid in water. The fountain solution may also contain other additives, which are soluble in or miscible with water, for example: ammonium phosphate, salts of citric acid, glycerin and other alcohols, polyglycols, dextrins, alginates, carboxymethyl celluloses and vegetable gums, all of which may be added singly or in combination.

For coloring purposes, small quantities of dyestuffs may be added to the solutions of polymeric sulfonic acid, which otherwise are colorless.

The invention will be further illustrated by reference to the following specific examples:

*Example 1*

A wetting and cleansing agent very suitable for use in offset printing is prepared from 999 ml. of water,
    1 g. of polyvinyl sulfonic acid, and
    1.0 mg. of the dyestuff Thymol Blue.

*Example 2*

A fountain solution for offset printing is prepared by mixing 300 ml. of water,
    700 ml. of glycerin,
    0.5 g. of polyvinyl sulfonic acid, and
    0.5 g. of polystyrene sulfonic acid.

The undiluted solution can be used as a cleansing agent for printing foils.

If the mixture is diluted with water to 10 times its volume, a very good fountain solution for offset printing is obtained. Formaldehyde or other disinfectant can be added to the diluted solution.

*Example 3*

A fountain solution for offset printing is prepared from 965 ml. of water,
    35 ml. of glycerin,
    0.01 g. of polyvinyl sulfonic acid, and
    1.0 g. of ammonium phosphate.

*Example 4*

A good fountain solution for offset printing is obtained by adding 5 g. of tertiary sodium citrate to the solution described in Example 2 and uniformly distributing it in the solution.

What is claimed is:

1. In an offset printing process, the improvement which comprises dampening the printing plate with an aqueous fountain solution containing 0.001 to 0.1 percent by weight of a compound selected from the group consisting of polyvinyl sulfonic acid and polystyrene sulfonic acid.

2. A process according to claim 1 in which the fountain solution also contains a dyestuff.

3. A process for cleaning a printing plate which comprises treating the plate with an aqueous solution containing 0.1 to 10 percent by weight of a compound selected from the group consisting of polyvinyl sulfonic acid and polystyrene sulfonic acid.

4. A process according to claim 3 in which the solution also contains a dyestuff.

References Cited by the Examiner

UNITED STATES PATENTS

| | | | |
|---|---|---|---|
| 2,186,945 | 1/1940 | Wood | 101—149.2 |
| 2,186,946 | 1/1940 | Wood | 101—149.2 |
| 2,760,432 | 8/1956 | Wood | 101—149.2 |
| 2,953,547 | 9/1960 | Patterson | 260—2.1 |
| 3,108,535 | 10/1963 | Uhlig | 101—149.2 |

FOREIGN PATENTS 897,220  5/1944  France.

OTHER REFERENCES

Basic Texts for Apprentices in Lithography, Group I, The Single-Color Offset Press, 1927, Lithographic Technical Foundation, Inc., page 100.

Reed, R. F.: Formulary, 1956, Lithographic Technical Foundation, Inc., pages 51, 53 and 57.

DAVID KLEIN, *Primary Examiner.*

T. D. TAYLOR, *Assistant Examiner.*